(12) United States Patent
Takano et al.

(10) Patent No.: US 6,686,022 B2
(45) Date of Patent: Feb. 3, 2004

(54) MAGNETIC RECORDING MEDIUM

(75) Inventors: Hiroaki Takano, Kanagawa (JP); Masaki Suzuki, Kanagawa (JP); Masanosuke Kunikata, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 130 days.

(21) Appl. No.: 09/990,610

(22) Filed: Nov. 21, 2001

(65) Prior Publication Data

US 2002/0122339 A1 Sep. 5, 2002

(30) Foreign Application Priority Data

Nov. 21, 2000 (JP) ........................................ 2000-354985

(51) Int. Cl.$^7$ ............................................... G11B 5/708
(52) U.S. Cl. .................... 428/141; 428/216; 428/323; 428/328; 428/329; 428/336; 428/694 BA; 428/694 BH; 428/694 BN; 428/694 BR
(58) Field of Search ................. 428/141, 216, 428/323, 328, 329, 336, 694 BA, 694 BH, 694 BN, 694 BR

(56) References Cited

U.S. PATENT DOCUMENTS 4,812,330 A   3/1989  Ishikuro et al.

FOREIGN PATENT DOCUMENTS

EP   0 962 919 A1   12/1999

Primary Examiner—Stevan A. Resan
(74) Attorney, Agent, or Firm—Stroock & Stroock & Lavan LLP

(57) ABSTRACT

Provided is a particulate magnetic recording medium with good output at high frequency, yielding a low coefficient of friction, and having good running properties, in particular, a magnetic recording medium affording good electromagnetic characteristics and good repeat durability in recording and reproducing at a high-density. The magnetic recording medium comprises a lower layer comprising a nonmagnetic powder and a binder and an upper magnetic layer comprising a ferromagnetic powder, a binder and at least one abrasives provided on a nonmagnetic support in this order. The number of abrasive particles present on said magnetic layer surface satisfied the relation $0.2 \leq X \leq 1.2$ (particles/$\mu m^2$). When the number of pairs of abrasive particles satisfying the relation $L \leq 2K$ (where K denotes the mean particle diameter of the abrasive and L denotes the distance from the center of gravity of one of the abrasive particles to the center of gravity of the other abrasive particle) is denoted as Y (particles/$\mu m^2$), Y/X is equal to or less than 2.

20 Claims, No Drawings

MAGNETIC RECORDING MEDIUM

FIELD OF THE INVENTION

The present invention relates to a magnetic recording medium provided a magnetic layer in which a ferromagnetic powder and a binder are dispersed on a nonmagnetic support, especially, having excellent electromagnetic characteristics and running durability.

BACKGROUND OF THE INVENTION

Particulate magnetic recording media in which a magnetic layer comprised of ferromagnetic iron oxide, Co-modified ferromagnetic iron oxide, $CrO_2$, ferromagnetic alloy powders, or the like dispersed in a binder is particulate on a nonmagnetic support have been widely employed as magnetic recording media such as video tapes, audio tapes, and magnetic tapes. Further, in tape-like particulate magnetic recording media, a backcoat layer is provided as needed on the reverse surface of the support from the magnetic layer.

In such magnetic recording media, a higher degree of original sound reproduction capability is demanded of audio tapes used to record and reproduce music. In video tapes, good original image reproduction capability is demanded. In computer backup tapes and disks, good durability and no data loss are demanded.

With the trends toward high density with short recording wavelengths in recent years, a thick magnetic layer has resulted in problems in the form of self-magnetization loss during recording and thickness loss during reproduction, leading to decreased output. Thus, the thickness of the magnetic layer has been reduced. However, when the thickness of the magnetic layer is reduced to about 2 $\mu$m or less, the nonmagnetic support tends to affect the surface of the magnetic layer, and electromagnetic characteristics and dropout tend to deteriorate.

A method employing a simultaneous multilayer coating technique by which a nonmagnetic coated layer is provided as a lower layer for the magnetic layer and a high-density magnetic coating solution is thinly coated is one method of solving this problem (Japanese Unexamined Patent Publication (KOKAI) Showa Nos. 63-191315 and 63-187418). Based on these inventions, it is possible to manufacture a particulate magnetic recording medium with a thin magnetic layer and to obtain a magnetic recording medium with better electromagnetic characteristics. However, in recent years, the demand for high-density magnetic recording media has increased markedly.

Conventionally, to reduce magnetic tape wear and tape damage during VTR running, solid lubricants such as carbon black and liquid lubricants such as fatty acid esters have been added to the magnetic layer. The addition of abrasives such as alumina to the magnetic layer is also generally practiced. However, when the quantity of solid lubricants and abrasives added is increased, the fill ratio of the magnetic powder in the magnetic layer and the surface smoothness of the magnetic layer decrease, causing a drop in reproduction output. Since the presence of liquid lubricants on the magnetic layer surface and in the magnetic layer is affected, there are problems in the form of dependency on the environment during use and over time. The addition of a large quantity of abrasives causes wear of the magnetic head, minute changes in the contact state in proximity to the gap, and changes in the reproduction envelope, thereby shortening the service life of the VTR.

It is desirable for such magnetic tapes themselves not to be worn down or damaged by the magnetic head or running contact parts of the VTR or the like, and for the magnetic tapes not to cause wear of the magnetic head as small as possible.

To satisfy the above-stated requirements, various investigation has been conducted to-date:

1) Japanese Unexamined Patent Publication (KOKAI) Heisei No. 6-52541: Describes limiting the average protrusion height of abrasive particles present in the magnetic layer surface to equal to or less than 15 nm, thereby affording improvement in head wear and head fouling.
2) Japanese Unexamined Patent Publication (KOKAI) Heisei No. 6-309650: Discloses specifying the content of lubricants and the protrusion height and their present concentration on the magnetic layer surface to improve running properties.
3) Japanese Unexamined Patent Publication (KOKAI) Heisei Nos. 6-12651 and 6-12652: Disclose specifying the surface roughness of the magnetic layer and the protrusion height and present concentration on the magnetic layer surface to balance electromagnetic characteristics, running properties, and durability.

In recent years, with high-density recording and high recording rates, shortening of the wavelength of the recording frequency and narrowing of magnetic recording head tracks have progressed as means of increasing the recording capacity per unit area. In particular, there is a demand for magnetic recording media recording and reproducing at high density with a minimum recording wavelength equal to or less than 0.7 $\mu$m and a track pitch equal to or less than 25 $\mu$m. Further, the trend is toward increasing the relative head/tape velocity by increasing the rotational speed of the cylinder. Thus, in the above-cited prior art, it is no longer possible to balance electromagnetic characteristics and running durability.

SUMMARY OF THE INVENTION

One object of the present invention is to provide a particulate magnetic recording medium with good output at high frequency, yielding a low coefficient of friction, and having good running properties. A further object of the present invention is to stably provide a magnetic recording medium performing high-density recording and reproduction at a minimum recording wavelength equal to or less than 0.7 $\mu$m and a track pitch equal to or less than 25 $\mu$m affording good electromagnetic characteristics and good repeat durability.

The present inventors have extensively researched as for structures and manufacture method of a magnetic layer and a nonmagnetic layer in order to achieve the above-mentioned problems. As a result, they discovered that the above-mentioned problems can be solved by a magnetic recording medium provided a lower layer comprising a nonmagnetic powder and a binder and an upper magnetic layer comprising a ferromagnetic powder and a binder, as well as further comprising at least one abrasives in this order on a nonmagnetic support, wherein the number of abrasive particles present on said magnetic layer surface satisfied the relation $0.2 \leq X \leq 1.2$ (particles/$\mu m^2$), and when the number of pairs of abrasive particles satisfying the relation $L \leq 2K$ (where K denotes the mean particle diameter of the abrasive and L denotes the distance from the center of gravity of one of the abrasive particles to the center of gravity of the other abrasive particle) is denoted as Y (particles/$\mu m^2$), Y/X is equal to or less than 2.

To achieve good sliding characteristics of the head and tape while maintaining smoothness of the magnetic layer surface without greatly decreasing the fill rate, it is considered necessary for the abrasive contained in the magnetic layer to be in the form of microparticles (for example, with a mean particle diameter of 0.1 to 0.6 $\mu$m). However, when the abrasive is in the form of microparticles, severe aggregation of abrasive particles is known to occur; in particular, when the magnetic layer is thin, as the particle diameter of the abrasive approaches the thickness of the magnetic layer, aggregates are often observed. This is attributed to aggregates of abrasive that were concealed in the direction of thickness of the magnetic layer becoming prominent with the decrease in layer thickness.

Such abrasive aggregates are known to cause increased noise and head abrasion in the same manner as when coarse abrasives are employed, irrespective of whether or not microgranular abrasives have been employed. A portion or all of the abrasive particles drop out from the aggregate, causing abrasive wear between the tape surface and the cylinder and head, as well as head fouling and cylinder fouling.

In response to the above problems, the present inventors discovered that by inhibiting such abrasive aggregation (dispersing microgranular abrasives without causing aggregation), optimum electromagnetic characteristics and durability could be achieved. That is, the magnetic recording medium of the present invention is characterized in that the number X of abrasive particles present on the magnetic layer surface satisfies the relation $0.2 \leq X \leq 1.2$ (particles/$\mu$m$^2$), and when the number of pairs of abrasive particles satisfying the relation $L \leq 2K$ (where K denotes the mean particle diameter of the abrasive and L denotes the distance from the center of gravity of one of the abrasive particles to the center of gravity of the other abrasive particle) is denoted as Y (particles/$\mu$m$^2$), Y/X is equal to or less than 2.

The minimum number X of abrasive particles present on the magnetic layer surface is specified as 0.2 particles/$\mu$m$^2$. Setting X to equal to or higher than 0.2 particles/$\mu$m$^2$ is advantageous in that head fouling during running does not increase, still life does not decrease due to inadequate durability with repeated running, and clogging tends not to occur. Further, the maximum of the number X of abrasive particles is set to 1.2 particles/$\mu$m$^2$. When X is equal to or less than 1.2 particles/$\mu$m$^2$, head abrasion advantageously does not increase.

Further, the maximum of the value Y/X of the ratio of the number Y of abrasive particle pairs satisfying the relation $L \leq 2K$ to the number of abrasive particles X present on the surface of the magnetic layer is specified as 2. When Y/X is set to equal to or less than 2, head abrasion does not increase, the bit error rate (BER) does not increase, and dropout of particles from abrasive aggregates does not occur. Further, the abrasive wear between the tape and the cylinder and guide that causes head and cylinder fouling does not occur.

The lower limit of Y/X is not limited; however, for example, the lower limit may be set to 0.2.

As set forth further below, a magnetic recording medium satisfying the above-stated conditions can be obtained by conducting mixing and dispersion of the abrasive during manufacturing of the magnetic recording medium, particularly during preparation of the magnetic layer coating solution, more forcefully than in prior art. This will be described further below.

In the magnetic recording medium of the present invention, the mean particle diameter of the abrasive incorporated into the magnetic layer is desirably 0.1 to 0.6 $\mu$m from the perspectives of striking a balance between head abrasion, repetition durability, and electromagnetic characteristics.

Further, in the magnetic recording medium of the present invention, the thickness of the magnetic layer is desirably 0.05 to 0.6 $\mu$m. A magnetic layer thickness of 0.05 to 0.6 $\mu$m affords the advantage of yielding sharp reversal of magnetization enabling high recording density.

The magnetic recording medium of the present invention is particularly effective when the mean particle diameter of the abrasive incorporated into the magnetic layer falls within the range of 0.3 to 2 times the thickness of the magnetic layer.

Further, in the magnetic recording medium of the present invention, the thickness of the above-mentioned lower layer is desirably 0.5 to 2.0 $\mu$m and the coercivity of the magnetic layer is desirably ranges from 159 to 239 KA/m. A lower layer that is 0.5 to 2.0 $\mu$m in thickness affords the advantage of yielding a smooth magnetic layer surface. Further, a magnetic layer coercivity ranging from 159 to 239 KA/m affords the advantages of sharp isolated reversal waveforms and sharp reversal of magnetization.

DETAILED EXPLANATION OF THE INVENTION

Magnetic Layer

The magnetic layer of the magnetic recording medium of the present invention comprises a ferromagnetic powder dispersed in a binder. The ferromagnetic powder for use is a ferromagnetic iron oxide, cobalt-containing ferromagnetic iron oxide, barium ferrite powder, ferromagnetic metal powder or the like.

Simple substances and alloys such as Fe, Ni, Fe—Co, Fe—Ni, Co—Ni, and Co—Ni—Fe are examples of ferromagnetic metal powders. Aluminum, silicon, sulfur, scandium, titanium, vanadium, chromium, manganese, copper, zinc, yttrium, molybdenum, rhodium, palladium, gold, tin, antimony, boron, barium, tantalum, tungsten, rhenium, silver, lead, phosphorus, lanthanum, cerium, praseodymium, neodymium, tellurium, bismuth, and the like may be incorporated in a range not exceeding 20 weight percent of the metal component.

Further, the magnetic powder may be one comprising 10 to 40 atomic percent of Co, 2 to 20 atomic percent of Al, and 1 to 15 atomic percent of Y relative to Fe, such as is described in Japanese Unexamined Patent Publication (KOKAI) Heisei No. 8-255334, for example, from the perspective of reducing sintering and improving dispersion. Further, the ferromagnetic metal powder may comprise small quantities of water, hydroxides, and oxides.

Further, the ferromagnetic powder employed in the magnetic layer of the magnetic recording medium of the present invention has a major axis length, chiefly of Fe, of 0.05 to 0.19 $\mu$m and the crystalline size thereof is desirably 100 to 230 Angstroms from the perspective of lowering noise as well as increasing the magnetic powder fill rate. Further, the ferromagnetic powder employed in the magnetic layer of the magnetic recording medium of the present invention desirably has a coercivity Hc of 79 to 316 KA/m and an $\sigma$s of 1.26 to 2.26$\times 10^{-4}$ Wb.m/kg to reduce recording demagnetization losses and to prevent a reduction in magnetization level due to thermal fluctuation. Further, the specific surface area (Sbet) of the ferromagnetic powder is desirably 35 to 60 m$^2$/g and the pH thereof equal to or higher than 7 from the perspective of achieving suitable dispersion solution viscosity and compatibility with the binder.

In the case of hexagonal ferrite ferromagnetic powder, the plate diameter is 40 nm or less, preferably 35 nm or less. The coercivity Hc desirably falls within the range stated above. The $\sigma$s is 45 to 75 A.m$^2$/kg, preferably 50 to 70 A.m$^2$/kg and the plate-shaped (tabular) ratio (plate diameter/thickness) is 2 to 15, preferably 3 to 8. The average particle volume is 2,000 to 12,000 nm, preferably 3,000 to 10,000 nm$^3$.

Methods of manufacturing these ferromagnetic particles are known, and the ferromagnetic powder employed in the present invention can be manufactured by known methods.

Although the shape of the ferromagnetic powder is not specifically limited, ferromagnetic powders that are acicular, granular, cubic, rice-particle shaped (also referred to as "spindle shaped"), or plate-shaped are generally employed. Acicular and spindle-shaped ferromagnetic powders are employed with preference.

Conventionally known thermoplastic resins, thermosetting resins, reactive resins, and the like may be employed as binders in the magnetic layer of the magnetic recording medium of the present invention. Preferred binders are vinyl chloride resin, vinyl chloride-vinyl acetate resin, cellulose resins such as nitrocellulose, phenoxy resins, and polyurethane resins. Of these, the use of vinyl chloride resin, vinyl chloride—vinyl acetate resin, or a polyurethane resin is preferred because it imparts a hardness to the backcoat layer close to that of the magnetic layer, permitting a reduction in back transfer. Further, employing polyurethane resin comprising a ring structure and an ether group as at least a portion of the binder is desirable from the perspective of increasing dispersibility.

Binders of particular preference are polyurethane resins obtained by reacting a diol and organic diisocyanate. Based on the polyurethane resin, the diol is comprised of 17 to 40 weight percent of a short-chain diol having a ring structure and 10 to 50 weight percent of a long-chain diol having an ether bond. The diol further comprises 1.0 to 5.0 mol/g of ether bonds in the long-chain diol based on the polyurethane resin. The Tg is −20 to 150° C., preferably 20 to 120° C., and more preferably 50 to 100° C. Such polyurethane resins are described in detail in Japanese Unexamined Patent Publication (KOKAI) Heisei No. 8-293155.

When the cyclic portion of the long-chain diol is either aliphatic or aromatic, it is preferable that the binder composition is adjusted so that both calendering forming properties and coating strength are achieved by optimizing the coating Tg so that the coating Tg is 50 to 150° C., preferably 70 to 100° C., and the coating Tg is equal to the calendering temperature ±30° C.

The binder is usually cured with a polyisocyanate curing agent. The curing agent is employed in a proportion of 0 to 150 weight parts, preferably 0 to 100 weight parts, and more preferably 0 to 50 weight parts, per 100 weight parts of polyurethane resin.

The content of hydroxyl groups in the polyurethane resin is desirably 3 to 20 per molecule, more preferably 4 to 5 per molecule. When there are three or more per molecule, the reaction with the polyisocyanate-curing agent progresses well, yielding both good coating strength and durability. When equal to or less than 20, neither solubility in solvents nor dispersibility decrease.

A compound having three or more functional groups in the form of hydroxyl groups may be employed to adjust the content of hydroxyl groups in the polyurethane resin. Specific examples are trimethylolethane, trimethylolpropane, trimellitic anhydride, glycerin, pentaerythritol, hexanetriol, the branching polyester having a dibasic acid obtained from a starting material in the form of a polyester polyol and three or more functional groups in the form of hydroxyl groups by use of said compound as glycol components that is described in Japanese Examined Patent Publication (KOKOKU) Heisei No. 6-64726, and polyetheresters. Trifunctional compounds are preferred; compounds that are tetrafunctional or greater tend to gel during the reaction.

The polyurethane resin desirably comprises in the molecule at least one polar group selected from among —SO$_3$M, —OSO$_3$M, —COOM, —PO$_3$MM', —OPO$_3$MM', —NRR', and —N$^+$RR'R" (where M and M' each independently denote a hydrogen atom, alkali metal, alkaline earth metal, or ammonium salt and R, R', and R" each independently denote an alkyl group with 1 to 12 carbon atoms), with —SO$_3$M and —OSO$_3$M being particularly preferred. The quantity of these polar groups is desirably from $1\times10^{-5}$ to $2\times10^{-4}$ eq/g, preferably from $5\times10^{-5}$ to $1\times10^{-4}$ eq/g. At $1\times10^{-5}$ eq/g or greater, onto the powder is adequate and dispersibility is good, while at $2\times10^{-4}$ eq/g or less, good dispersibility in solvent is achieved without a decrease in solubility in the solvent.

The number average molecular weight (Mn) of the polyurethane resin is preferably 5,000 to 100,000, more preferably 10,000 to 50,000, and still more preferably 20,000 to 40,000. At 5,000 and above, the coating has good strength without decreased durability, and at 100,000 or less, solubility and dispersibility in the solvent are good. The cyclic structure of polyurethane resin affects rigidity, with the ether group contributing to flexibility. The above-mentioned polyurethane resin is highly soluble, has a high inertial radius (molecular spread), and good dispersibility in powder. Further, polyurethane resin itself is characterized by both hardness (high Tg, high Young's modulus) and toughness (elongation).

The organic solvent employed in the present invention may be used in any ratio. Examples are ketones such as acetone, methyl ethyl ketone, methyl isobutyl ketone, diisobutyl ketone, cyclohexanone, isophorone, and tetrahydrofuran; alcohols such as methanol, ethanol, propanol, butanol, isobutyl alcohol, isopropyl alcohol, and methylcyclohexanol; esters such as methyl acetate, butyl acetate, isobutyl acetate, isopropyl acetate, ethyl lactate, and glycol acetate; glycol ethers such as glycol dimethyl ether, glycol monoethyl ether, and dioxane; aromatic hydrocarbons such as benzene, toluene, xylene, cresol, and chlorobenzene; chlorinated hydrocarbons such as methylene chloride, ethylene chloride, carbon tetrachloride, chloroform, ethylene chlorohydrin, and dichlorobenzene; N,N-dimethylformamide; and hexane. These organic solvents need not be 100 percent pure and may contain impurities such as isomers, unreacted materials, by-products, decomposition products, oxides and moisture in addition to the main components. The content of these impurities is preferably equal to or less than 30 percent, more preferably equal to or less than 10 percent. Preferably the same type of organic solvent is employed in the present invention in the magnetic layer and in the nonmagnetic layer. However, the amount added may be varied. The stability of coating is increased by using a solvent with a high surface tension (such as cyclohexanone or dioxane) in the nonmagnetic layer. Specifically, it is important that the arithmetic mean value of the upper layer solvent composition be not less than the arithmetic mean value of the lower layer solvent composition. To improve dispersion properties, a solvent having a somewhat strong polarity is desirable. It is desirable that solvents having a dielectric constant equal to or higher than 15 are comprised equal to or higher than 50 percent of the solvent composition. Further, the dissolution parameter is desirably from 8 to 11.

In addition to the above-described components, the coating material used to form the magnetic layer may also comprise abrasives such as α-alumina, Cr$_2$O$_3$, red iron oxide, and zirconia. Of these, α-alumina and $Cr_2O_3$ are preferred, with α-alumina being particularly preferred. The mean particle diameter of the abrasives, as stated above, desirably falls with a range of 0.3 to 2.0 times the thickness of the magnetic layer. In particular, as stated above, the mean particle diameter of the abrasive incorporated into the magnetic layer is desirably 0.1 to 0.6 μm from the perspectives of balancing head abrasion, repeat durability, and electromagnetic characteristics.

The magnetic layer forming coating material may also comprise other commonly employed additives and fillers such as antistatic agents such as carbon black; lubricants such as fatty acids, fatty acid esters and silicone oils; dispersants.

The magnetic layer of the magnetic recording medium of the present invention desirably has a Tg equal to or higher than 30° C. and equal to or less than 150° C. from the perspective of increasing running durability. Further, the thickness of the magnetic layer is 0.01 to 1.0 μm, preferably 0.05 to 0.6 μm, and more preferably 0.1 to 0.4 μm from the perspective of achieving sharp reversal of magnetization to increase digital recording performance. When the magnetic layer is thinner than 0.01 μm, the magnetic layer essentially ceases to exist. When the thickness of the magnetic layer is equal to or less than 1.0 μm, self-magnetization losses do not increase and the surface does not become rough. The object may be achieved with one or multiple magnetic layers. When multiple magnetic layers are employed, the technique described in Japanese Unexamined Patent Publication (KOKAI) Heisei No. 6-139555 may be applied.

Further, the magnetic recording medium of the present invention desirably has a squareness equal to or higher than 0.82 and an SFD equal to or less than 0.5 from the perspective of achieving high output and good erasure characteristics.

Lower Nonmagnetic Layer

The lower nonmagnetic layer will be described in detail below. Nonmagnetic inorganic powders may be selected from inorganic compounds and nonmagnetic metals such as metal oxides, metal carbonates, metal sulfates, metal nitrides, metal carbides, metal sulfides and the like. Examples of inorganic compounds are titanium oxide ($TiO_2$, TiO), α-alumina having an α-conversion rate ranging from 90 to 100 percent, B-alumina, γ-alumina, α-iron oxide, chromium oxide, zinc oxide, tin oxide, tungsten oxide, vanadium oxide, silicon carbide, cerium oxide, corundum, silicon nitride, titanium carbide, silicon dioxide, magnesium oxide, zirconium oxide, boron nitride, calcium carbonate, calcium sulfate, barium sulfate, molybdenum disulfide, goethite, and aluminum hydroxide; these may be employed singly or in combination. Particular preferred are titanium dioxide, zinc oxide, iron oxide and barium sulfate. Even more preferred are titanium dioxide and iron oxide. Examples of nonmagnetic metals are Cu, Ti, Zn and Al. These nonmagnetic powders preferably have a mean particle diameter ranging from 0.005 to 2 μm, but nonmagnetic powders of differing particle size may be combined as needed, or the particle diameter distribution of a single nonmagnetic powder may be broadened to achieve the same effect. What is preferred most is a nonmagnetic powder having a mean particle diameter ranging from 0.01 to 0.2 μm. The pH of the nonmagnetic powder ranging from 6 to 9 is particularly preferred. The specific surface area (Sbet) of the nonmagnetic powder ranges from 1 to 100 $m^2/g$, preferably from 5 to 50 $m^2/g$. further preferably from 7 to 40 $m^2/g$. The crystalline size of the nonmagnetic powder preferably ranges from 0.01 to 2 μm. The oil absorption capacity utilizing DBP ranges from 5 to 100 ml/100 g, preferably from 10 to 80 ml/100 g, further preferably from 20 to 60 ml/100 g. The specific gravity ranges from 1 to 12, preferably from 3 to 6. The shape may be any of acicular, spindle-shaped, spherical, polyhedral, or plate-shaped. The ignition loss is desirably equal to or less than 20 weight percent. The Mohs' hardness of the above-mentioned nonmagnetic powder employed in the present invention is preferably equal to or higher than 4. The roughness factor of the powder surface preferably ranges from 0.8 to 1.5, more preferably from 0.9 to 1.2. The stearic acid (SA) adsorption capacity ranges from 1 to 20 $\mu mol/m^2$, preferably from 2 to 15 $\mu mol/m^2$. The heat of wetting in 25° C. water of the nonmagnetic powder of the lower layer is preferably within the range of $2 \times 10^{-5}$ to $6 \times 10^{-5}$ $J/cm^2$ (200 to 600 $erg/cm^2$). A solvent with a heat of wetting within this range may also be employed. The number of water molecules at 100 to 400° C. suitably ranges from 1 to 10 molecules/100 A. The pH at an isoelectric point in water preferably ranges from 3 to 6.

At least a portion of the surface of these powders is preferably treated by coating with at least one compound selected from $Al_2O_3$, $SiO_2$, $TiO_2$, $ZrO_2$, $SnO_2$, $Sb_2O_3$ and ZnO. $Al_2O_3$, $SiO_2$, $TiO_2$ and $ZrO_2$ are particular preferred with regard to dispersibility, and further preferred is $Al_2O_3$, $SiO_2$ and $ZrO_2$. They may be used singly or in combination. Depending on the objective, a surface-treatment coating layer with a coprecipitated material may also be employed, the coating structure which comprises a first alumina coating and a second silica coating thereover or the reverse structure thereof may also be adopted. These may be employed singly or in combination. Depending on the objective, the surface-treatment coating layer may be a porous layer, with homogeneity and density being generally desirable.

Specific examples of nonmagnetic powders suitable for use in the nonmagnetic lower layer of the present invention are: UA5600, UA5605 from Showa Denko K. K.; AKP-20, AKP-30, AKP-50, HIT-55, HIT-100 and ZA-G1 from Sumitomo Chemical Co., Ltd.; G5, G7 and S-1 from Nippon Chemical Industrial Co., Ltd.; TF-100, TF-120, TF-140 and R516 from Toda Kogyo Corp.; TTO-51B, TTO-55A, TTO-55B, TTO-55C, TTO-55S, TTO-55D, FT-1000, FT-2000, FTL-100, FTL-200, M-1, S-1, SN-100, R-820, R-830, R-930, R-550, CR-50, CR-80, R-680 and TY-50 from Ishihara Sangyo Co., Ltd.; ECT-52, STT-4D, STT-30D, STT-30 and STT-65C from Titan Kogyo K. K.; T-1 from Mitsubishi Materials Corporation; NS-O, NS-3Y and NS-8Y from Nippon Shokubai Co., Ltd.; MT-100S, MT-100T, MT-150W, MT-500B, MT-600B and MT-100F from Tayca Corporation; FINEX-25, BF-1, BF-10, BF-20, BF-1L and BF-10P from Sakai Chemical Industry Co., Ltd.; DEFIC-Y and DEFIC-R from Dowa Mining Co., Ltd.; Y-LOP from Titan Kogyo K.K.; and sintered products of the same.

The known effect of lowering surface resistivity Rs can be reduced by mixing carbon black in the lower layer. Furnace black for rubber, thermal for rubber, black for coloring, acetylene black and the like can be used therefor. The specific surface area ranges from 100 to 500 $m^2/g$, preferably from 150 to 400 $m^2/g$. The DBP oil absorption capacity ranges from 20 to 400 ml/100 g, preferably from 30 to 200 ml/100 g. The particle diameter ranges from 5 to 80 mμ, preferably from 10 to 50 mμ, further preferably from 10 to 40 mμ. It is preferable that the pH ranges from 2 to 10, the moisture content ranges from 0.1 to 10 percent and the tap density ranges from 0.1 to 1 g/ml. Specific examples of carbon black suitable for use in the present invention are BLACKPEARLS2000, 1300, 1000, 900, 800, 880 and 700 from Cabot Corporation; #3050B, 3150B, 3250B, #3750B,

3950B, #950, #650B, #970B, #850B and MA-600 from Mitsubishi Chemical Corporation; CONDUCTEX SC, RAVEN 8800, 8000, 7000, 5750, 5250, 3500, 2100, 2000, 1800, 1500, 1255 and 1250 from Columbia Carbon Co., Ltd.; Ketjen Black from Lion Akzo Co., Ltd.

The carbon black employed can be surface treated with a dispersing agent or the like, grafted with a resin, or a portion of the surface may be graphite-treated. Further, the carbon black may be dispersed with a binder prior to being added to the coating material. These types of carbon black are employed in a range that does not exceed 50 weight percent with respect to the inorganic powder above and does not exceed 40 percent with respect to the total weight of the nonmagnetic layer. These types of carbon black may be employed singly or in combination. The *Carbon Black Handbook* compiled by the Carbon Black Association may be consulted for types of carbon black suitable for use in the present invention.

As regards binders, lubricants, dispersants, and additives; solvents; dispersion methods and the like of the nonmagnetic layer, the above-mentioned techniques for magnetic layers may be applied. In particular, the known techniques for magnetic layer can be applied to the amount and type of binders, the addition amount and type of additives and dispersants Known films such as polyesters including polyethylene terephthalate and polyethylene naphthalate; polyolefins; cellulose triacetate, polycarbonate, polyamide, polyimide, polyamidoimide, polysulfones, aramides, and aromatic polyamides may be employed as the nonmagnetic flexible support of the present invention. The nonmagnetic flexible support may comprise 50 molar percent or more of an aromatic polyamide resin, examples of which are given by:

—NHCO—Ar$^1$—CONH—Ar$^2$ (wherein Ar$^1$ and Ar$^2$ denote bivalent organic groups comprising at least one aromatic ring, preferably having from 6 to 25 carbon atoms) and —CO—Ar$^3$—NH—

(wherein Ar$^3$ denotes a bivalent organic group comprising at least one aromatic ring, preferably having from 6 to 25 carbon atoms). Examples of aromatic polyamide resins are paraphenilene terephthalamide, paraphenilene isophthalamide, methaphenilene terephthalamide, and methaphenyl isopthalamide.

The phenyl nucleus of the aromatic ring may further comprise a substituent such as a chloro group, nitro group, alkyl group, or alkoxy group. Aromatic polyamides comprised chiefly of paraphenilene terephthalamide are preferred; they are good materials for high-density recording media having good mechanical strength, a high modulus of elasticity, a low coefficient of moisture absorption, good heat resistance, and good mechanical and thermal dimensional stability.

Examples of monomers comprising aromatic polyamides of the above-described structure are acid chlorides such as terephthalic chloride and diamines such as paraphenilene diamine and methaphenilene diamine.

Such aromatic polyamides are described in Japanese Patent No. 2,628,898, for example. Examples of aromatic polyamides that are readily commercially available are Aramica (from Asahi Kasei Corporation) and Mictron (from Toray Industries. Inc.).

These supports may be subjected beforehand to corona discharge treatment, plasma treatment, adhesion enhancing treatment, heat treatment, dust removal, and the like. Achieving the object of the present invention requires the use of a flexible nonmagnetic support with a centerline average surface roughness (cutoff value 0.25 mm) equal to or less than 0.05 μm, preferably equal to or less than 0.04 μm, and still more preferably equal to or less than 0.02 μm. Further, not only is it desirable that these nonmagnetic supports have low centerline average surface roughnesses, they also desirably do not have coarse protrusions equal to or greater than 1 μm. The coarseness of the shape of the surface of the nonmagnetic support is controlled as necessary through the size and quantity of filler that is added to the support. Examples of such fillers are oxides and carbonates of Ca, Si, Ti, and the like, as well as organic micropowders such as acrylics. The F-5 value of the nonmagnetic support employed in the present invention is desirably 0.049 to 0.49 GPa (5 to 50 kg/mm$^2$) in the tape running direction and 0.029 to 0.29 GPa (3 to 30 kg/mm$^2$) in the tape width direction. The F-5 value in the tape longitudinal direction is generally higher than the F-5 value in the tape width direction unless there is some particular need to increase the strength in the width direction.

The thermal shrinkage rate of the support in the direction of running and the width direction of the tape after 30 minutes at 100° C. is preferably equal to or less than 3 percent, more preferably equal to or less than 1.5 percent. The thermal shrinkage rate after 30 min at 80° C. is equal to or less than 1 percent, preferably equal to or less than 0.5 percent. A breaking strength in both directions ranging from 0.049 to 0.98 GPa (5 to 100 kg/mm$^2$), and the modulus of elasticity ranging from 0.98 to 19.6 GPa (100 to 2000 kg/mm$^2$) are desirable.

The magnetic recording medium of the present invention may also have layers other than the magnetic layer. For example, it may have a backcoat layer provided on the opposite surface from the magnetic layer, a soft magnetic layer comprising a soft magnetic powder, a second magnetic layer, a cushion layer, an overcoat layer, an adhesive layer, and a protective layer. These layers can be provided at positions suited to effectively performing their functions.

As for the thickness structure of the magnetic recording medium of the present invention, the flexible nonmagnetic support suitably has a thickness ranging from 1 to 100 μm, preferably from 4 to 80 μm. The total thickness of the magnetic and nonmagnetic layers may be $\frac{1}{100}$ to twice of the thickness of the flexible nonmagnetic support. An undercoat layer may be provided between the flexible nonmagnetic support and the nonmagnetic layer. The thickness of the undercoat layer ranges from 0.01 to 2 μm, preferably from 0.02 to 0.5 μm. A backcoat layer may be provided on the opposite surface to the magnetic layer on the flexible nonmagnetic support. The thickness ranges from 0.1 to 2 μm, preferably from 0.3 to 1.0 μm. The known undercoat layer and backcoat layer can be used.

As for the thickness of layers, for example, the magnetic layer may range from 0.01 to 1 μm, preferably from 0.05 to 0.6 μm, further preferably from 0.1 to 0.4 μm in thickness, and the nonmagnetic layer may range from 0.1 to 3 μm, preferably from 0.5 to 3 μm, further preferably from 0.6 to 2 μm in thickness. The thickness of the nonmagnetic layer is preferably thicker than that of the magnetic layer. In addition, the magnetic recording medium having two magnetic layers is also preferable. In this case, for example, the upper layer may range from 0.2 to 2 μm, preferably from 0.2 to 1.5 μm, and the lower layer may range from 0.8 to 2 μm.

The thickness of the backcoat layer provided on the magnetic recording medium of the present invention is preferably set within the range of 0.05 to 0.5 μm. In this range, it is preferred to set within the range of 0.05 to 0.4 μm, more preferably from 0.05 to 0.3 μm.

The use of a granular oxide in the backcoat layer of the magnetic recording medium of the present invention is desirable. These use of any from among titanium oxide, α-iron oxide, and mixtures thereof as the granular oxide is preferred. The usually employed titanium oxides and α-iron oxides may be employed. The particle shape is not specifically limited. When spherical, particles 0.01 to 0.1 μm in diameter are suitable, and when acicular, particles with an acicular ratio of 2 to 20 are suitable. A major axis length of 0.05 to 0.3 μm is desirable. At least a portion of the surface of the granular oxide may be modified or coated with some other compound, examples being $Al_2O_3$, $SiO_2$, and $ZrO_2$.

Carbon black is desirably employed in the backcoat layer as an antistatic agent. The carbon blacks that are commonly employed in magnetic recording tapes may be widely employed in the backcoat layer. Examples that are suitable for use are furnace black for rubber, thermal black for rubber, black for coloring, and acetylene black. To prevent irregularities in the backcoat layer from being transferred to the magnetic layer, the particle diameter of the carbon black is preferably equal to or less than 0.3 μm. A particularly desirable particle diameter is 0.01 to 0.1 μm. The quantity of carbon black employed in the backcoat layer is preferably one yielding an optical transmission power (the transmission value of the TR-927 made by Macbeth Co.) equal to or less than 2.0.

To increase running durability, it is advantageous to employ two types of carbon black having different mean particle sizes in the backcoat layer. In that case, the combination of a first type of carbon black having a mean particle size of from 0.01 to 0.04 μm and a second type of carbon black having a mean particle size of from 0.05 to 0.3 μm is desirable. A suitable content of the second type of carbon black is from 0.1 to 10 weight parts, preferably from 0.3 to 3 weight parts, per 100 weight parts of the granular oxide and first type of carbon black combined.

The ratio by weight of the granular oxide to carbon black is from 60/40 to 90/10, preferably from 70/30 to 80/20. Employing the granular oxide in greater quantity than the carbon black in this manner permits the formation of a backcoat layer with good powder dispersion properties and a smooth surface. A backcoat layer coating material having such a composition has greater thixotropic properties than a conventional backcoat layer coating material comprised chiefly of carbon black. Thus, it becomes possible to coat at high concentration using extrusion methods and gravure methods. The application of such high-concentration coating materials permits the formation of a backcoat layer adhering with significant adhesive strength to the support and having high mechanical strength despite a low film thickness.

The quantity of binder employed may be selected from a range of 10 to 40, preferably 20 to 32, weight parts per 100 weight parts of granular oxide and carbon black combined. The film strength of the backcoat layer thus formed is high and surface resistivity is low.

Known thermoplastic resins, thermosetting resins, reactive resins and the like can be used as a binder for the backcoat layer of the present invention.

The dry thickness of the backcoat layer is normally about 0.2 to 1 μm, preferably 0.2 to 0.6 μm. To inhibit transfer of the backcoat layer to the magnetic layer even when rolled under high tension and stored, it is possible to employ a tape thickness of 4 to 9 μm.

The magnetic recording medium of the present invention may be manufactured by the application of a coating material on the surface of a nonmagnetic support such as an aromatic polyamide film under running so as to yield dry film thicknesses falling within the above-prescribed ranges, for example. Multiple magnetic coating materials and nonmagnetic coating materials may be sequentially or simultaneously applied in multiple layers. Coating machines suitable for use in applying the magnetic coating material are air doctor coaters, blade coaters, rod coaters, extrusion coaters, air knife coaters, squeeze coaters, immersion coaters, reverse roll coaters, transfer roll coaters, gravure coaters, kiss coaters, cast coaters, spray coaters, spin coaters, and the like. For example, "Recent Coating Techniques" (May 31, 1983), issued by the Sogo Gijutsu Center (K.K.) may be referred to in this regard.

The process for manufacturing the magnetic coating material for the magnetic recording medium of the present invention comprises at least a kneading step, a dispersing step, and a mixing step to be carried out, if necessary, before or after the kneading and dispersing steps. Each of the individual steps may be divided into two or more stages. All of the starting materials employed in the present invention, including the ferromagnetic powder, binders, carbon black, antistatic agents, lubricants, solvents, and the like, may be added at the beginning or during any of the steps. Moreover, the individual materials may be divided and added during two or more steps; for example, polyurethane may be divided and added in the kneading step, the dispersing step, and the mixing step for viscosity adjustment after dispersion. Such a process for manufacturing the magnetic coating material is described in detail, for example, in Japanese Examined Patent Publication (KOKOKU) Heisei Nos. 6-62897 and 6-82464.

In the magnetic recording medium of the present invention, an abrasive is uniformly dispersed in the magnetic layer as set forth above. To form such a magnetic layer, the abrasive must be admixed with a solution in which the binder and magnetic powder have been dispersed, and thoroughly mixed in prior to coating. When conducting simultaneous dispersion after admixing the magnetic powder, binder, and abrasive, the abrasive is sometimes microgranulated to a greater degree than necessary, tending to cause a drop in abrasive strength and a decrease in durability, and the microgranulated abrasive tends to compromise the orientation of the magnetic powder and electromagnetic characteristics. When conducting simultaneous dispersion after addition of a magnetic solution and abrasive, it is necessary to employ an abrasive reflecting the abrasive strength and particle diameter of the abrasive following dispersion. When mixing in an abrasive of a certain particle diameter after dispersion of the magnetic powder and binder, the use of the abrasive in the form of a slurry into which a binder and a solvent have been mixed is preferred. The abrasive slurry may be independently dispersed and adjusted to a specific particle diameter. In that case, the dispersion medium is preferably zirconia, with its high specific gravity. When separately preparing the abrasive dispersion and the magnetic dispersion and then admixing them, the admixing is conducted at a peripheral speed of the stirring blades in the stirrer of preferably 10 to 25 m/s, more preferably 13 to 20 m/s. The time required for mixing varies with the particle diameter of the abrasive, the viscosity of the dispersion solutions of magnetic powder and binder, and the capacity of the tank.

Conventionally known manufacturing techniques may of course be utilized for some of the steps in order to manufacture the magnetic recording medium of the present invention. In the kneading step, a continuous kneader, a pressure kneader and the like having a strong kneading force may be used. If using a continuous kneader or a pressure kneader, the ferromagnetic powder and all or part of the binder (preferably equal to or higher than 30 percent of the entire quantity of binder) are kneaded in the range of 15 to 500 weight parts per 100 weight parts of ferromagnetic powder. Details of the kneading treatment are described in Japanese Unexamined Patent Publication (KOKAI) Heisei No. 1-106338 and Japanese Unexamined Patent Publication (KOKAI) Showa No. 64-79274. When preparing the lower nonmagnetic layer liquid, a dispersing medium having a high specific gravity is desirably utilized, with zirconia beads being suitable.

The followings are examples of devices and methods for coating the magnetic recording medium having a multilayered structure of the present invention.

1. The lower layer is first applied with a coating device commonly employed to apply magnetic application liquids such as a gravure coating, roll coating, blade coating, or extrusion coating device, and the upper layer is applied while the lower layer is still wet by means of a support pressure extrusion coating device such as is disclosed in Japanese Examined Patent Publication (KOKOKU) Heisei No. 1-46186 and Japanese Unexamined Patent Publication (KOKAI) Showa No. 60-238179 and Japanese Unexamined Patent Publication (KOKAI) Heisei No. 2-265672.

2. The upper and lower layers are applied nearly simultaneously by a single coating head having two built-in slits for passing coating liquid, such as is disclosed in Japanese Unexamined Patent Publication (KOKAI) Showa No. 63-88080, Japanese Unexamined Patent Publication (KOKAI) Heisei No. 2-17971, and Japanese Unexamined Patent Publication (KOKAI) Heisei No. 2-265672.

3. The upper and lower layers are applied nearly simultaneously using an extrusion coating apparatus with a backup roller as disclosed in Japanese Unexamined Patent Publication (KOKAI) Hesei No. 2-174965.

To prevent compromising the electromagnetic characteristics or the like of the magnetic recording medium by aggregation of ferromagnetic powder, shear is desirably imparted to the coating liquid in the coating head by a method such as disclosed in Japanese Unexamined Patent Publication (KOKAI) Showa No. 62-95174 or Japanese Unexamined Patent Publication (KOKAI) Heisei No. 1-236968. In addition, the viscosity of the coating liquid must satisfy the numerical range specified in Japanese Unexamined Patent Publication (KOKAI) Heisei No. 3-8471. To obtain the magnetic recording medium of the present invention, strong orientation must be applied. A solenoid equal to or higher than 1,000 G (0.1 T) and a rare-earth magnet equal to or higher than 2,000 G (0.2 T) are desirably employed together oriented with like poles opposed each other. It is also desirable to provide a suitable drying step prior to orientation so as to achieve the highest orientation property following drying. Further, when the present invention is being applied as a disk medium, an orientation method achieving random orientation is rather required.

The direction in which the upper magnetic layer and lower magnetic layer are oriented for changing the orientation direction does not necessarily have to be the longitudinal in-plane direction, but may be the vertical direction or width direction.

Following magnetic field processing to magnetically orient the ferromagnetic powder contained in the magnetic layer, the coated magnetic layer is dried.

The backcoat layer can be prepared by applying a backcoat layer coating material in which granular components such as abrasives, antistatic agents, and the like are dispersed in an organic solvent with a binder on the reverse surface from the magnetic layer. As set forth in the above-described preferred mode, adequate dispersibility can be ensured by employing a larger quantity of granular compounds than carbon black. Thus, preparation of the backcoat layer coating material can be accomplished without the conventionally required roll kneading. Further, the quantity of residual cyclohexanone following drying may be reduced by lowering the carbon black content even if cyclohexanone is employed as solvent.

The magnetic layer is processed to smooth the surface thereof with a super calender roll or the like after drying. Surface smoothing eliminates pores generated by removal of the solvent during drying and improves the fill rate of ferromagnetic powder in the magnetic layer. It is thus possible to obtain a magnetic recording tape with good electromagnetic characteristics.

Heat-resistant plastic rollers of epoxy, polyimide, polyamide, polyamidoimide or the like are employed as calender processing rollers. Processing may also be conducted with metal rollers.

The magnetic recording medium of the present invention preferably has a highly smooth surface. Such a highly smooth surface may be effectively obtained by selecting a special calender such as one of those described above and subjecting the magnetic layer that has been formed to the above-described calendering process. Processing by calender is conducted at a calender roll temperature of 60 to 100° C., preferably 70 to 100° C., and more preferably 80 to 100° C., and at a pressure, as denoted by linear pressure, of 100 to 500 kg/cm, preferably 200 to 450 kg/cm, and still more preferably 300 to 400 kg/cm. The magnetic recording tape obtained is cut to desired size with a cutting unit or the like for use. The calendered magnetic recording tape is commonly heat treated to reduce the amount of thermal shrinkage.

The friction coefficient for SUS420J of the magnetic layer surface of the magnetic recording medium of the present invention and its opposite surface is preferably equal to or less than 0.5, more preferably equal to or less than 0.3. The surface specific resistivity preferably ranges from $10^4$ to $10^{12}$ $\Omega$/sq, the modulus of elasticity at 0.5% elongation of the magnetic layer in both the running direction and the width direction preferably ranges from 0.98 to 19.6 GPa (100 to 2,000 kg/mm$^2$) and the break strength preferably ranges from 1 to 30 kg/cm$^2$. The modulus of elasticity of the magnetic recording medium in both the running direction and the longitudinal direction preferably ranges from 0.98 to 14.7 GPa (100 to 1,500 kg/mm$^2$) and the residual elongation is preferably equal to or less than 0.5 percent. The thermal shrinkage rate at any temperature equal to or less than 100° C. is preferably equal to or less than 1 percent, more preferably equal to or less than 0.5%, and most preferably equal to or less than 0.1 percent. The glass transition temperature (i.e., the temperature at which the loss elastic modulus of dynamic viscoelasticity peaks as measured at 110 Hz) of the magnetic layer preferably ranges from 50° C. to 120° C., and that of the lower nonmagnetic layer preferably ranges from 0° C. to 100° C. The loss elastic modulus preferably falls within a range of from $1 \times 10^3$ to $8 \times 10^4$ N/cm$^2$ ($1 \times 10^8$ to $8 \times 10^9$ dyne/cm$^2$) and the loss tangent is preferably equal to or less than 0.2. Adhesion failure tends to occur when the loss tangent becomes excessively large.

The residual solvent comprised in the magnetic layer is preferably equal to or less than 100 mg/m$^2$, more preferably equal to or less than 10 mg/m$^2$. Less residual solvent is desirably comprised in the second layer than in the first layer. The void rate of both the nonmagnetic lower layer and the magnetic layer is desirably equal to or less than 30 percent by volume, preferably equal to or less than 20 percent by volume. Although a low void rate is desirable to achieve high output, there are cases where it is desirable to ensure a certain level based on the objective. For example, in magnetic recording media for data recording in which repeat use is important, a high void rate is often desirable to achieve running durability. When the magnetic characteristics of the magnetic recording medium of the present invention are measured at a magnetic field of 796 kA/m (10 KOe), squareness in the tape running direction is equal to or higher than 0.70, preferably equal to or higher than 0.80, and still more preferably equal to or higher than 0.85. Squareness in the two directions perpendicular to the tape running direction is desirably equal to or less than 80 percent of squareness in the running direction. The switching field distribution (SFD) of the magnetic layer is preferably equal to or less than 0.5. The centerline surface roughness (cutoff value 0.25 mm) Ra of the magnetic layer is preferably 1 to 10 nm, but this value may be suitably set based on the objective. The smaller the Ra value the better when it comes to improving electromagnetic characteristics, but the higher the value the better when it comes to achieving good running durability. The root mean square (RMS) surface roughness, or RRMS, as evaluated by atomic force microscopy (AFM), desirably falls within the range of 2 to 15 nm.

The magnetic recording medium of the present invention comprises a lower nonmagnetic layer and an upper magnetic layer. It will be readily understood that the physical characteristics of the lower layer and the magnetic layer may be changed based on the objective. For example, the magnetic layer can be imparted with a high modulus of elasticity to improve running durability while at the same time imparting to the lower layer a lower modulus of elasticity than that of the magnetic layer to improve head contact with the magnetic recording medium. What physical characteristics to impart to two or more magnetic layers can be determined by consulting techniques relating to known magnetic multilayers. For example, there are many inventions imparting a higher Hc to the upper magnetic layer than to the lower layer, such as disclosed in Japanese Examined Patent Publication (KOKOKU) Showa No. 37-2218 and Japanese Unexamined Patent Publication (KOKAI) Showa No. 58-56228. However, making the magnetic layer thin as in the present invention permits recording even on a magnetic layer of comparatively high Hc.

EMBODIMENTS

Manufacturing Method of Magnetic Tape

Magnetic Layer

| | |
|---|---|
| Ferromagnetic metal powder | 100 parts |
| Composition Fe/Co = 100/30 | |
| Hc 187 kA/m | |
| Specific surface area by BET method 49 m²/g | |
| Crystalline size 160 Å | |
| Surface covering compound $Al_2O_3$, $SiO_2$, $Y_2O_3$ | |
| Particle size (major axis diameter) 0.09 μm | |
| Acicular ratio 7 | |
| σ s: 145 A · m²/kg | |

-continued

| | |
|---|---|
| Vinyl chloride copolymer | 10 parts |
| MR-110 from Nippon Zeon Co., Ltd. | |
| Polyurethane resin | 6 parts |
| UR8200 from Toyobo Co., Ltd. | |
| α-$Al_2O_3$ | Referring to Tables 1 to 3 |
| (Referring to Tables 1 to 3 for mean particle diameter) | |
| Carbon black | 0.5 parts |
| (Mean particle diameter 0.08 μm) | |
| Butyl stearate | 1 part |
| Stearic acid | 5 parts |
| Methyl Ethyl Ketone | 90 parts |
| Cyclohexanone | 30 parts |
| Toluene | 60 parts |
| Lower coating layer (Nonmagnetic) | |
| Nonmagnetic powder α$Fe_2O_3$ hematite | 80 parts |
| Major axis length 0.15 μm | |
| Specific surface area by BET method 52 m²/g | |
| pH 8 | |
| Tap density 0.8 g/l | |
| DBP oil absorption capacity 27 to 38 g/100 g | |
| Surface covering compound $Al_2O_3$, $SiO_2$ | |
| Carbon black | 20 parts |
| Mean primary particle diameter 16 mμ | |
| DBP oil absorption capacity 80 ml/100 g | |
| pH 8.0 | |
| Specific surface area by BET method 250 m²/g | |
| Volatile content 1.5% | |
| Vinyl Chloride copolymer | 12 parts |
| MR-110 from Nippon Zeon Co., Ltd. | |
| Polyester polyurethane resin | 5 parts |
| UR5500A from Toyobo Co., Ltd. | |
| α-$Al_2O_3$ | 1 part |
| (Mean particle diameter 0.3 μm) | |
| Butyl stearate | 1 part |
| Stearic acid | 1 part |
| Methyl Ethyl Ketone | 100 parts |
| Cyclohexanone | 50 parts |
| Toluene | 50 parts |

Each of the components of the coating materials were kneaded in an open kneader and then dispersed in a sand mill. An abrasive slurry was added to the magnetic solution obtained. Tables 1 to 3 give the most outer circumference speed (peripheral speed) of the stirring blades of the stirrer employed. To the dispersions obtained were added 5 parts of polyisocyanate (Coronate L from Nippon Polyurethane Industry Co., Ltd.) for the coating liquid of the lower coating layer and one part for the magnetic upper layer, after which 40 parts of a mixed solvent of methyl ethyl ketone and cyclohexanone were added to each of the solutions. The solutions were then passed through a filter having an average pore size of 1 μm to complete preparation of the lower layer coating solution and magnetic layer coating solution. Simultaneous multilayer coating was performed in which, on a polyethylene terephthalate support 6.0 μm in thickness and having a centerline average surface roughness for magnetic layer coated surfaces of 0.001 μm the lower layer coating solution was applied so as to eventually yield a dry thickness of 1.3 μm, and immediately after this application a magnetic layer was applied thereover to a thickness of 0.25 μm. While both layers were still wet, orientation was conducted with a cobalt magnet having a magnetic force of 5,000 G (500 mT) and a solenoid having a magnetic force of 4,000 G (400 mT), and the layers were dried. They were then processed with a seven-stage calender comprising metal rollers and epoxy rollers at a temperature of 100° C. at a rate of 200 m/min.

Subsequently, a backcoat layer was applied to a thickness of 0.5 μm. Slitting to a width of 6.35 mm was then conducted to complete a 123-minute DVCPRO tape.

In Embodiments 1 to 6 and Comparative Examples 1 and 2, 9.5 weight parts of abrasive (alumina) were added and tapes were prepared. In Comparative Example 3, 2.5 weight parts of abrasive were added and a tape was similarly prepared. In Comparative Example 4, 20 weight parts of abrasive were added and a tape was similarly prepared.

The characteristics of the magnetic tapes obtained were measured by the following methods; the results are given in Tables 1 to 4.

Reproduction Output

The bit error rate (BER) at 25° C. and 60 percent RH was measured with an AJ-D750 (from Matsushita Electric Industry Co., Ltd.) industrial-use digital VTR (DVCPRO).

Full-Length Running

Reproduction and rewinding were repeatedly conducted 100 times in an environment of 23° C. and 50 percent RH with an AJ-D750 (from Matsushita Electric Industry Co., Ltd.) industrial-use digital VTR (DVCPRO) and head fouling was evaluated following full-length running. Fouling was determined for the shoulder portion of each head by a five-point method. Heads with larger numbers had less fouling.

Head Abrasion

Recording, rewinding, and reproduction were conducted with eight connected tapes in an environment of 23° C. and 50 percent RH with an AJ-D750 (from Matsushita Electric Industry Co., Ltd.) industrial-use digital VTR (DVCPRO) and the amount of abrasion was measured.

Number and Distance of Abrasive Particles on Surface

Five sections of tape surface were observed by SEM at 20,000 times magnification, the number of abrasive particles on the surface was counted, and the distance from one abrasive particle to other abrasive particles was measured.

fouling and a lower BER than Comparative Examples 1 and 2, in which Y/X was greater than 2.

TABLE 2

|  |  | Comparative Example 3 | Comparative Example 4 |
|---|---|---|---|
| Mixing condition | Peripheral speed of stirring blades (m/s) | 13 | 13 |
| Particle diameter of abrasive (K) | (μm) | 0.25 | 0.25 |
| Addition amount of abrasive | (weight parts) | 2.5 | 20 |
| Number of abrasive on surface (X) | (particle/μm$^2$) | 0.14 | 1.4 |
| Count number of abrasive pairs (Y) | (particles/μm$^2$) | 0.18 | 2.0 |
| Y/X ≦ 2 | ○ denotes it is within the range | ○1.3 | ○1.4 |
| Thickness of upper layer | (μm) | 0.05 | 0.3 |
| Head fouling | (μm/30 H) | 0.26 | 0.53 |
| Head abrasion | After 100 passes | X2.1 | ○4.0 |
| BER |  | 6.2 × 10$^{-5}$ | 4.2 × 10$^{-4}$ |

As shown in Table 2, Comparative Example 3 had a smaller quantity of abrasive added than Embodiment 1 and was prepared to have a surface abrasive particle number X of less than 0.2. As a result, Comparative Example 3 had poor durability and increased head fouling. Comparative Example 4 had a large amount of abrasive added and was prepared to have a surface abrasive particle number X of greater than 1.2. As a result, Comparative Example 4 exhib-

TABLE 1

|  |  | Embodiment 1 | Embodiment 2 | Comp. Ex. 1 | Comp. Ex. 2 |
|---|---|---|---|---|---|
| Mixing condition | Peripheral speed of stirring blades (m/s) | 13 | 10 | 4 | 8 |
| Particle diameter of abrasive (K) | (μm) | 0.25 | 0.25 | 0.25 | 0.25 |
| Addition amount of abrasive | (weight parts) | 9.5 | 9.5 | 9.5 | 9.5 |
| Number of abrasive on surface (X) | (particles/μm$^2$) | 0.45 | 0.45 | 0.45 | 0.45 |
| Count number of abrasive pairs (Y) | (particles/μm$^2$) | 0.6 | 0.8 | 1.5 | 1.0 |
| Y/X ≦ 2 | ○ denotes it is within the range | ○1.3 | ○1.8 | ×3.3 | ×2.2 |
| Thickness of upper layer | (μm) | 0.3 | 0.3 | 0.3 | 0.3 |
| Head fouling | (μm/30 H) | 0.3 | 0.33 | ×0.6 | ×0.55 |
| Head abrasion | After 100 passes | ○4.0 | ○4.1 | X2.5 | X2.5 |
| BER |  | 5.5 × 10$^{-5}$ | 5.5 × 10$^{-5}$ | X 4.2 × 10$^{-4}$ | X 6.0 × 10$^{-4}$ |

Based on the results of Table 1, Embodiments 1 and 2, in which Y/X was equal to or less than 2, exhibited no aggregation of abrasive, and less head abrasion and head ited a high level of head abrasion and a poor BER. This showed that a surface abrasive particle number X of 0.2 to 1.2 was desirable.

TABLE 3

| | | Embodiment 3 | Embodiment 4 | Embodiment 5 | Embodiment 6 |
|---|---|---|---|---|---|
| Mixing condition | peripheral speed of stirring blades (m/s) | 13 | 13 | 13 | 13 |
| Particle diameter of abrasive (K) | ($\mu$m) | 0.14 | 0.6 | 0.25 | 0.25 |
| Addition amount of abrasive | (weight parts) | 9.5 | 9.5 | 9.5 | 9.5 |
| Number of abrasive on surface (X) | (particles/$\mu$m$^2$) | 0.55 | 0.3 | 0.22 | 0.42 |
| Count number of abrasive pairs (Y) | (particles/$\mu$m$^2$) | 0.8 | 0.2 | 0.25 | 0.5 |
| Y/X ≦ 2 | ○ denotes it is within the range | ○1.5 | ○0.7 | ○1.1 | ○1.2 |
| Thickness of upper layer | ($\mu$m) | 0.3 | 0.3 | 0.05 | 0.6 |
| Head fouling | ($\mu$m/30 H) | 0.25 | 0.23 | 0.26 | 0.31 |
| Head abrasion | After 100 passes | ○3.6 | ○3.5 | ○3.8 | ○3.5 |
| BER | | 7.0 × 10$^{-5}$ | 5.5 × 10$^{-5}$ | 4.8 × 10$^{-5}$ | 6.5 × 10$^{-5}$ |

Based on the results of Embodiments 3 and 4 in Table 3, when the particle diameter (K) of the abrasive was at least within the range of 0.1 to 0.6 $\mu$m, good head abrasion and head fouling results were achieved. Based on the results of Embodiments 5 and 6, when the thickness of the upper layer was at least within the range of 0.05 to 0.6, a good BER was ensured.

Based on the present invention, a particulate magnetic recording medium having good high-frequency output, yielding a low frictional coefficient, and having good running properties is provided.

The present disclosure relates to the subject matter contained in Japanese Patent Application No. 2000-354985 filed on Nov. 21, 2000, which is expressly incorporated herein by reference in its entirety.

What is claimed is:

1. A magnetic recording medium comprising:
a lower layer comprising a nonmagnetic powder, and a binder and an upper magnetic layer having a magnetic layer surface and comprising a ferromagnetic powder, a binder and at least one abrasives material provided on a nonmagnetic support in this order,
wherein said abrasive material has a plurality of abrasive particles, the number of abrasive particles X present on said magnetic layer surface, counted using a scanning electron microscope at 20,000 times magnification, satisfies the relation 0.2≦X≦1.2 (particles/$\mu$m$^2$), and when the number of pairs of abrasive particles satisfying the relation L≦2K (where K denotes the mean particle diameter of the abrasive, measuring using the scanning electron microscope at 20,000 times magnification, and L denotes the distance from the center of gravity of one of the abrasive particles to the center of gravity of to other abrasive particle, measured using the scanning electron microscope at 20,000 times magnification) is denoted as Y (particles/$\mu$m$^2$), Y/X is equal to or less than 2.

2. The magnetic recording medium according to claim 1 wherein said abrasive has the mean particle diameter ranging from 0.1 to 0.6 $\mu$m.

3. The magnetic recording medium according to claim 1 wherein said magnetic layer has a thickness ranging from 0.05 to 0.6 $\mu$m.

4. The magnetic recording medium according to claim 1 wherein said abrasive has a mean particle diameter falling within the range of 0.3 to 2 times the thickness of the magnetic layer.

5. The magnetic recording medium according to claim 1 wherein said lower layer has a thickness ranging from 0.5 to 2.0 $\mu$m.

6. The magnetic recording medium according to claim 1 wherein said magnetic layer has coercivity ranging from 159 to 239 KA/m.

7. The magnetic recording medium according to claim 1 wherein said ferromagnetic powder is a ferromagnetic metal powder chiefly of Fe.

8. The magnetic recording medium according to claim 7 wherein said ferromagnetic metal powder has a major axis length of 0.05 to 0.19 $\mu$m.

9. The magnetic recording medium according to claim 7 wherein said ferromagnetic metal powder has a crystalline size ranging from 100 to 230 Angstroms.

10. The magnetic recording medium according to claim 7 wherein said ferromagnetic metal powder has a coercivity Hc of 79 to 316 KA/m and an σ s of 1.26 to 2.26×10$^{-4}$ WB.m/kg.

11. The magnetic recording medium according to claim 7 wherein said ferromagnetic metal powder has a specific surface area ranging from 35 to 60 m$^2$/g and a pH equal to or higher than 7.

12. The magnetic recording medium according to claim 1 wherein said ferromagnetic powder is a hexagonal ferrite ferromagnetic powder.

13. The magnetic recording medium according to claim 12 wherein said hexagonal ferrite ferromagnetic powder has a plate diameter of 40 mm or less.

14. The magnetic recording medium according to claim 12 wherein said hexagonal ferrite ferromagnetic powder has a coercivity Hc of 79 to 316 KA/m.

15. The magnetic recording medium according to claim 12 wherein said hexagonal ferrite ferromagnetic powder has a σs ranging from 45 to 75 A.m²/kg.

16. The magnetic recording medium according to claim 12 wherein said hexagonal ferrite ferromagnetic powder has a σs ranging from 50 to 70 A.m²/kg.

17. The magnetic recording medium according to claim 12 wherein said hexagonal ferrite ferromagnetic powder has a plate diameter/thickness ratio ranging from 2 to 15.

18. The magnetic recording medium according to claim 12 wherein said hexagonal ferrite ferromagnetic powder has a plate diameter/thickness ratio ranging from 3 to 8.

19. The magnetic recording medium according to claim 12 wherein said hexagonal ferrite ferromagnetic powder has an average particle volume ranging from 2,000 to 12,000 nm³.

20. The magnetic recording medium according to claim 12 wherein said hexagonal ferrite ferromagnetic powder has an average particle volume ranging from 3,000 to 10,000 nm³.

* * * * *